United States Patent
Urabe et al.

(10) Patent No.: US 11,928,160 B2
(45) Date of Patent: Mar. 12, 2024

(54) CLASSIFICATION DEVICE, CLASSIFICATION METHOD, AND CLASSIFICATION PROGRAM

(71) Applicant: Nippon Telegraph and Telephone Corporation, Tokyo (JP)

(72) Inventors: Yuki Urabe, Musashino (JP); Shiro Ogasawara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 180 days.

(21) Appl. No.: 17/618,979

(22) PCT Filed: Jun. 17, 2019

(86) PCT No.: PCT/JP2019/023954
§ 371 (c)(1),
(2) Date: Dec. 14, 2021

(87) PCT Pub. No.: WO2020/255219
PCT Pub. Date: Dec. 24, 2020

(65) Prior Publication Data
US 2022/0365972 A1    Nov. 17, 2022

(51) Int. Cl.
*G06F 16/906* (2019.01)
*G06F 16/93* (2019.01)
*G06Q 10/10* (2023.01)

(52) U.S. Cl.
CPC ............ *G06F 16/906* (2019.01); *G06F 16/93* (2019.01); *G06Q 10/10* (2013.01)

(58) Field of Classification Search
CPC ...... G06F 16/355; G06F 16/906; G06F 16/93; G06Q 10/10
See application file for complete search history.

(56) References Cited

U.S. PATENT DOCUMENTS

| | | | |
|---|---|---|---|
| 7,853,465 B2 * | 12/2010 | Molesky | G06Q 10/063 705/7.11 |
| 2009/0112841 A1 * | 4/2009 | Devarakonda | G06F 16/36 707/999.005 |
| 2010/0186091 A1 * | 7/2010 | Turner | G06F 21/552 715/256 |

(Continued)

FOREIGN PATENT DOCUMENTS

| | | |
|---|---|---|
| CN | 109284372 | 1/2019 |
| JP | 2015153210 | 8/2015 |

(Continued)

OTHER PUBLICATIONS

Urabe et al., "Study of business process visualization method using operation log," IEICE Technical Report, Mar. 2019, 118(483):83-88, 15 pages (with English Translation).

*Primary Examiner* — Etienne P Leroux
(74) *Attorney, Agent, or Firm* — Fish & Richardson P.C.

(57) ABSTRACT

A classification device includes processing circuitry configured to obtain operation logs describing operation content for a window on a terminal screen, classify the operation logs into a plurality of groups, using a document classification method, based on the operation content of the operation logs, and assign words characteristic of respective groups as labels to these groups, and cause an output device to output the operation logs assigned the labels.

4 Claims, 21 Drawing Sheets

(56) References Cited

U.S. PATENT DOCUMENTS

| | | | | |
|---|---|---|---|---|
| 2013/0035929 | A1* | 2/2013 | Okamoto | G06Q 10/10 704/9 |
| 2013/0191107 | A1* | 7/2013 | Tonouchi | G06F 11/3485 703/21 |
| 2013/0263222 | A1* | 10/2013 | Kobayashi | H04L 63/105 726/4 |
| 2019/0325066 | A1* | 10/2019 | Krishna | G06F 16/3347 |

FOREIGN PATENT DOCUMENTS

| | | |
|---|---|---|
| JP | 2018147352 | 9/2018 |
| JP | 2018181177 | 11/2018 |

* cited by examiner

Fig. 2

```
CUSTOMER INFORMATION REGISTRATION SCREEN

CASE ID :   111111

■ NAME     [DENDEN TARO]

■ PREFEC-  [HOKKAIDO ▼]
        TURE

■ ADDRESS  [YOKOSUKA CITY, KANAGAWA PREF.]

■ SERVICE TYPE    ● SERVICE A
                        ○ SERVICE B
                        ○ SERVICE C

[DELETE]        [SAVE]        [REGISTER]
```

Fig. 3

| DESCRIPTION CONTENT OF OPERATION LOG |
|---|
| OPERATION TIME |
| INFORMATION IDENTIFYING OPERATION TARGET WINDOW |
| DESCRIPTION CONTENT |

Fig. 4

| OPERATION LOG ID | OPERATION TIME | INFORMATION IDENTIFYING OPERATION TARGET WINDOW | DESCRIPTION CONTENT |
|---|---|---|---|
| 1 | 2019/03/27 13:15:32 | https://www.shuccho_shinsei.html | BUSINESS TRIP APPLICATION SYSTEM, SECTION NAME, NAME OF PERSON IN CHARGE, BUSINESS TRIP DESTINATION; PLEASE ENTER BUSINESS TRIP ROUTE WITH LOWEST PRICE. |
| 2 | 2019/03/27 13:21:10 | https://train_info.html | TRANSFER GUIDE, DEPARTURE POINT, DESTINATION POINT, DEPARTURE TIME, TRANSIT, BUS, TRAIN, AIRPLANE,... |
| ... | ... | ... | ... |
| 15,023 | 2019/3/27 14:15:23 | PURCHASE APPLICATION SYSTEM, Koubai.exe | GOODS NAME, REQUEST DATE, PURCHASE DESTINATION, CONTRACT TYPE, DELIVERY DESTINATION, DELIVERY DATE, COMPUTER, PRICE, SPEC,...; IF DELIVERY PRICE IS 5 MILLION OR HIGHER, CHECK FOLLOWING, PLEASE. |

T1

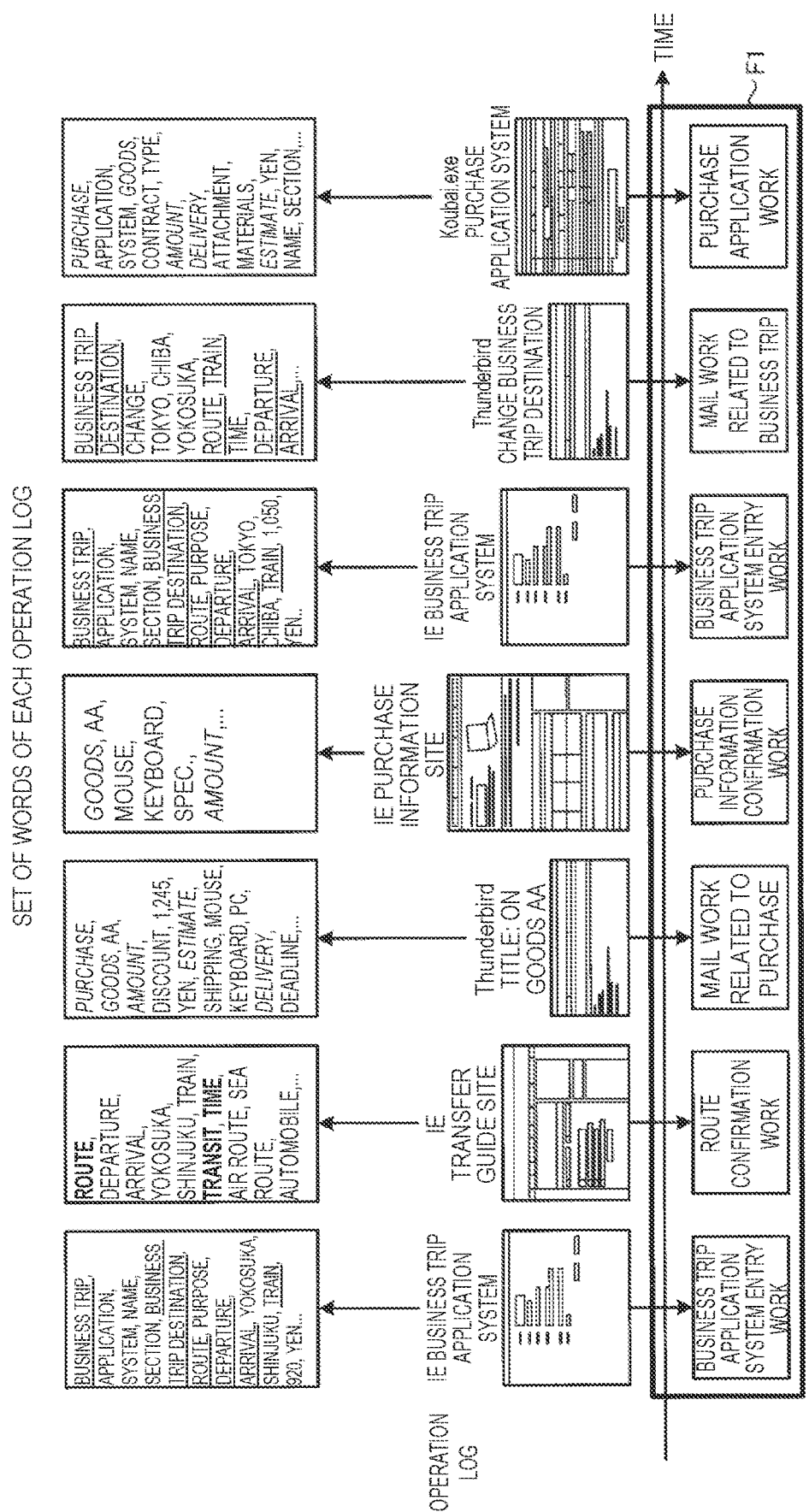

Fig. 6

| OPERATION LOG ID | OPERATION TIME | INFORMATION IDENTIFYING OPERATION TARGET WINDOW | DESCRIPTION CONTENT | LABEL |
|---|---|---|---|---|
| 1 | 2019/03/27 13:15:32 | https://www.shuccho_shinsei.html | BUSINESS TRIP APPLICATION SYSTEM, SECTION NAME, NAME OF PERSON IN CHARGE, BUSINESS TRIP DESTINATION, PLEASE ENTER BUSINESS TRIP ROUTE WITH LOWEST PRICE | BUSINESS TRIP |
| 2 | 2019/03/27 13:21:10 | https://train_info.html | TRANSFER GUIDE, DEPARTURE POINT, DESTINATION POINT, DEPARTURE TIME, TRANSIT, BUS, TRAIN, AIRPLANE,... | BUSINESS TRIP |
| ... | ... | ... | ... | ... |
| 15,023 | 2019/3/27 14:15:23 | PURCHASE APPLICATION SYSTEM, Koubai.exe | GOODS NAME, REQUEST DATE, PURCHASE DESTINATION, CONTRACT TYPE, DELIVERY DESTINATION, DELIVERY DATE, COMPUTER, PRICE, SPEC......, IF DELIVERY PRICE IS 5 MILLION OR HIGHER, CHECK FOLLOWING, PLEASE. | PURCHASE |

| BUSINESS DOCUMENT ID | TITLE | FILE PATH/URL | DESCRIPTION CONTENT |
|---|---|---|---|
| 1 | TRAVEL EXPENSE REQUEST ISSUANCE MANUAL | https://company.co.jp/ryohi_manual | AS TO METHOD OF BUSINESS TRIP APPLICATION, PLEASE USE TRAVEL EXPENSE REQUEST ISSUANCE SYSTEM FOR DAY TRIP. ACCESS IS ALLOWED AT URL XX. |
| 2 | OPERATION METHOD FOR PURCHASE APPLICATION SYSTEM | ¥¥filepath¥¥purchase¥¥system_operation_method.pdf | OPERATION METHOD FOR PURCHASE APPLICATION SYSTEM. FIRST,..., NEXT,..... |
| ... | ... | ... | ... |
| 2,014 | ISSUANCE METHOD IN CASES OF MULTIPLE BUSINESS TRIP DESTINATIONS | ¥¥filepath¥2019¥travel_expense_request_issuance¥multiple_business_trip_destinations.pptx | IN CASES OF MULTIPLE BUSINESS TRIP DESTINATIONS, ISSUE REQUEST ONE TIME.... |

| BUSINESS DOCUMENT ID | LABEL |
|---|---|
| 1 | BUSINESS TRIP |
| 2 | PURCHASE |
| ... | ... |
| 2,014 | BUSINESS TRIP |

[(USE:1), (PLEASE:1), (MAKE:1), (O:1), (TE [Japanese particle]:1), (LY:1), (HA [Japanese particle]:1), (WO [Japanese particle]:1), (TRANSPORTATION:1), (ACTUAL:1), (REQUEST:1), (ROUTE:1), (EXPENSES:1)]

Fig. 20

[(USE:0.41), (PLEASE:0.23), (D:0.41), (TE [Japanese particle]:0.13), (LY:0.41), (HA [Japanese particle]:0.13), (WO [Japanese particle]:0.06), (TRANSPORTATION:0.13), (ACTUAL:0.41), (REQUEST:0.13), (ROUTE:0.41), (EXPENSES:0.23)]

Fig. 21

1: ['TRANSPORTATION', 'EXPENSES', 'HA [Japanese particle]', 'ACTUAL', 'LY', 'USE', 'D', 'ROUTE', 'WO [Japanese particle]', 'REQUEST', 'MAKE', 'TE [Japanese particle]', 'PLEASE']

1: ['AIR', 'TICKET', 'HA [Japanese particle]', 'IN-KIND', 'SUPPLY', 'TO [Japanese particle]', 'NARU [Japanese verb]', 'BECAUSE', 'AIR', 'TICKET', 'AMOUNT', 'NO [Japanese particle]', 'SUPPLY', 'HA [Japanese particle]', 'ARU [Japanese verb]', 'MASU [Japanese auxiliary verb]', 'N [Japanese]', 'REQUEST', 'MAKE', 'WHEN', 'HA [Japanese particle]', 'TRANSPORTATION', 'SYSTEM', 'AIRPLANE', 'WO [Japanese particle]', 'SELECT', 'MAKE', 'TE [Japanese particle]', 'PLEASE']

1: ['COMMUTE', 'EXPENSES', 'SUPPLY', 'SECTION', 'TO [Japanese particle]', 'OVERLAPPING', 'MAKE', 'SECTION', 'NO [Japanese particle]', 'TRANSPORTATION', 'EXPENSES', 'HA [Japanese particle]', 'SUPPLY', 'MAKE', 'MASU [Japanese auxiliary verb]', 'N [Japanese]']

0: ['REQUEST', 'PERSON', 'GA [Japanese particle]', 'TEN THOUSAND', 'OR LESS', 'NO [Japanese particle]', 'ARTICLE', 'NO [Japanese particle]', 'NEW', 'PURCHASE', 'REQUEST', 'WO [Japanese particle]', 'ISSUANCE', 'MAKE']

0: ['SYSTEM', 'SCREEN', 'NO [Japanese particle]', 'MENU', 'BAR', 'NO [Japanese particle]', 'PURCHASE', 'COMMON', 'FROM', 'PURCHASE', 'MANAGEMENT', 'WO [Japanese particle]', 'SELECT', 'MAKE', 'PURCHASE', 'REQUEST', 'BUSINESS', 'WO [Japanese particle]', 'SELECT', 'FURTHER', 'PURCHASE', 'REQUEST', 'REGISTER', 'TO [Japanese particle]', 'SEQUENTIALLY', 'SELECT', 'MAKE', 'TE [Japanese particle]', 'IKU [Japanese verb]']

Fig. 22

[(USE:1), (PLEASE:1), (MAKE:1), (D:1), (TE [Japanese particle]:1), (LY:1), (HA [Japanese particle]:1), (WO [Japanese particle]:1), (TRANSPORTATION:1), (ACTUAL:1), (REQUEST:1), (ROUTE:1), (EXPENSES:1),]

Fig. 23

[(USE:0.41), (PLEASE:0.23), (D:0.41), (TE [Japanese particle]:0.13), (LY:0.41), (HA [Japanese particle]:0.13), (WO [Japanese particle]:0.06), (TRANSPORTATION:0.13), (ACTUAL:0.41), (REQUEST:0.13), (ROUTE:0.41), (EXPENSES:0.23)]

Fig. 24

1: ['TRANSPORTATION', 'EXPENSES', 'ACTUAL', 'ROUTE', 'REQUEST']
1: ['AIR', 'TICKET', 'IN-KIND', 'SUPPLY', 'AIR', 'TICKET', 'AMOUNT', 'SUPPLY', 'REQUEST', 'WHEN', 'TRANSPORTATION', 'SYSTEM', 'AIRPLANE', 'SELECT']
1: ['COMMUTE', 'EXPENSES', 'SUPPLY', 'SECTION', 'OVERLAPPING', 'SECTION', 'TRANSPORTATION', 'EXPENSES', 'SUPPLY']
0: ['REQUEST', 'PERSON', 'TEN THOUSAND', 'OR LESS', 'ARTICLE', 'NEW', 'PURCHASE', 'REQUEST', 'ISSUANCE']
0: ['SYSTEM', 'SCREEN', 'MENU', 'BAR', 'PURCHASE', 'COMMON', 'PURCHASE', 'MANAGEMENT', 'SELECT', 'PURCHASE', 'REQUEST', 'BUSINESS', 'SELECT', 'PURCHASE', 'REQUEST', 'REGISTER', 'SEQUENTIALLY', 'SELECT']

CLASSIFICATION DEVICE, CLASSIFICATION METHOD, AND CLASSIFICATION PROGRAM

CROSS-REFERENCE TO RELATED APPLICATIONS

This application is a National Stage application under 35 U.S.C. § 371 of International Application No. PCT/JP2019/023954, having an International Filing Date of Jun. 17, 2019. The disclosure of the prior application is considered part of the disclosure of this application, and is incorporated in its entirety into this application.

TECHNICAL FIELD

The present invention relates to a classification device, a classification method, and a classification program.

BACKGROUND ART

In order to achieve effective business improvement in corporations and the like, it is important to grasp target business correctly. A person in charge who performs business executes multiple business activities on a daily basis using an information terminal, such as a PC or a tablet. The business activities performed through the information terminal include multiple work activities. These work activities include various operations, such as an operation of inputting information in a text box on a system screen, and an operation of clicking a button.

A business analyzer is required to grasp the following matters, as assumptions of discussing business improvement. The matters are whether what type of the business activities and work activities are executed, and whether what time period and what procedures (operations) they are executed by. Here, a case is discussed in which the procedures and the time period of the work are grasped manually.

In order to grasp the procedures and the time period of the work, a business analyzer or the like is required to observe business, and measure and record the description of work, the procedures, and the time period for execution, through stopwatch or the like. However, manual recording requires efforts. Accordingly, continuous execution is difficult. In the case where the person in charge reports the work description and the time period required to execute the work, by themself depending on memory, continuation can be achieved, but it requires efforts, and the accuracy and reliability are low.

Conventionally, a method has been proposed that obtains operation logs, aggregate actual business activities and actual work activities on the basis of the operation logs, and visualizes the aggregation. The person in charge executes the business on various business systems, websites, or files. For example, information on the operation logs is the operation time period, information on operation screens, and information on operation objects (e.g., what business system, what file, and what textbox or what button in the operation screens), and is obtained at an operation granularity where the person in charge has input information in a text box and the like. However, visualization at the operation granularity has a fine granularity. Accordingly, it takes time for the business analyzer to obtain the actual business activities of the person in charge at rough granularities of business and work.

In a case of using the conventional method, to grasp the actual business activities of the person in charge at the business and work granularities, the business analyzer themself understands the meanings and specifications of the operation logs, and determines which business and work the content of the operation logs corresponds to. The business analyzer then manually performs labeling of a name of business, a name of work and the like, grouping, and setting of a grouping rule, so as to achieve an appropriate granularity.

CITATION LIST

Patent Literature

Patent Literature 1: Japanese Laid-Open Patent Publication No. 2015-153210

Non-Patent Literature

Non-Patent Literature 1: Urabe, Yagi, Tsuchikawa, and Masuda, "Study of business process visualization method using operation log," IEICE Technical Report, vol. 118, no. 483, ICM2018-64, pp. 83-88, March 2019

SUMMARY OF THE INVENTION

Technical Problem

Unfortunately, the conventional method requires that the business analyzer secures a time period for understanding the meanings and specifications of the operation logs, so as to grasp the actual business activities of the person in charge at the granularity of business or work. Furthermore, the conventional method requires that the business analyzer performs cumbersome processes, such as labeling, grouping, setting of the grouping rule or the like.

The present invention has been made in view of the above description, and has an object to provide a classification device, a classification method, and a classification program that can easily grasp actual business activities at the granularity of work or business, from operation logs.

Means for Solving the Problem

To solve the problem described above and achieve the object, a classification device of the present invention includes: processing circuitry configured to: obtain operation logs describing operation content for a window on a terminal screen; classify the operation logs into a plurality of groups, using a document classification method, based on the operation content of the operation logs, and assign words characteristic of respective groups as labels to these groups; and cause an output device to output the operation logs assigned the labels.

A classification device of the present invention includes: processing circuitry configured to: store a result of preliminary classification of business documents into a plurality of groups, based on business content, and store, together with the result, information about the groups of the business documents assigned words characteristic of respective groups, as labels; obtain operation logs describing operation content for a window on a terminal screen; classify the operation logs into the individual groups of the business documents, based on description content of the operation logs, and assign the labels of the corresponding groups to the operation logs; and causing an output device to output the operation logs assigned the labels.

A classification method of the present invention is a classification method executed by a classification device, including: obtaining operation logs describing operation content for a window on a terminal screen; classifying the operation logs into a plurality of groups, using a document classification method, based on the operation content of the operation logs, and assigning words characteristic of respective groups as labels to these groups; and causing an output device to output the operation logs assigned the labels.

A classification method of the present invention is a classification method executed by a classification device, including: storing a result of preliminary classification of business documents into a plurality of groups, based on business content, and storing, together with the result, information about the groups of the business documents assigned words characteristic of respective groups, as labels; obtaining operation logs describing operation content for a window on a terminal screen; classifying the operation logs into the individual groups of the business documents, based on description content of the operation logs, and assigning the labels of the corresponding groups to the operation logs; and causing an output device to output the operation logs assigned the labels.

A non-transitory computer-readable recording medium stores therein a classification program of the present invention causes a computer to execute a process including: obtaining operation logs describing operation content for a window on a terminal screen; classifying the operation logs into a plurality of groups, using a document classification method, based on the operation content of the operation logs, and assigning words characteristic of respective groups as labels to these groups; and causing an output device to output the operation logs assigned the labels.

A non-transitory computer-readable recording medium stores therein a classification program of the present invention causes a computer to execute a process including: storing a result of preliminary classification of business documents into a plurality of groups, based on business content, and storing, together with the result, information about the groups of the business documents assigned words characteristic of respective groups, as labels; obtaining operation logs describing operation content for a window on a terminal screen; classifying the operation logs into the individual groups of the business documents, based on description content of the operation logs, and assigning the labels of the corresponding groups to the operation logs; and causing an output device to output the operation logs assigned the labels.

Effects of the Invention

According to the present invention, actual business activities can be easily grasped at the granularity of work or business, from the operation logs.

BRIEF DESCRIPTION OF DRAWINGS

FIG. 2 exemplifies a window of a terminal screen.

FIG. 3 illustrates description content of an operation log.

FIG. 4 shows an example of a data configuration of operation log data.

FIG. 5 shows an example of a classification result.

FIG. 6 shows an example of a data configuration of operation logs assigned labels.

FIG. 12 shows an example of a data configuration of business document data.

FIG. 13 shows an example of a data configuration of business document group data.

FIG. 19 shows an example of an operation log vector.

FIG. 20 shows an example of the operation log vector.

FIG. 21 shows an example of a classification result of operation logs according to a topic model.

FIG. 22 shows an example of the operation log vector.

FIG. 23 shows an example of the operation log vector.

FIG. 24 shows an example of a classification result of operation logs according to an X-means.

DESCRIPTION OF EMBODIMENTS

Hereinafter, embodiments of a classification device, a classification method, and a classification program according to the present application are described in detail on the basis of the drawings. The present invention is not limited by the embodiments described below.

[Embodiment 1] First, Embodiment 1 is described. This Embodiment 1 relates to a technology of supporting grasping of actual business activities of corporations and the like. According to this Embodiment 1, actual business activities can be easily grasped at the granularity of work, from operation logs. The operation log is data that describes operation content for a window of a terminal screen by each person in charge.

Figure 1:
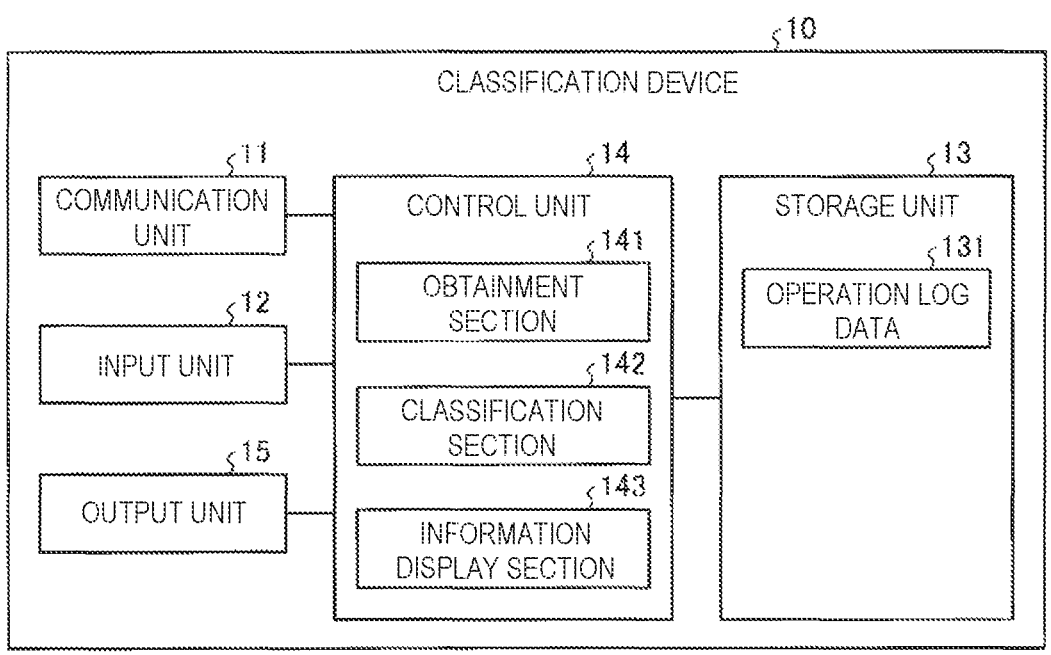
FIG. 1 is a block diagram showing an example of a configuration of a classification device according to Embodiment 1.

[Configuration of classification device] FIG. 1 is a block diagram showing an example of the configuration of a classification device according to Embodiment 1. As shown in FIG. 1, the classification device 10 according to this Embodiment 1 includes a communication unit 11, an input unit 12, a storage unit 13, a control unit 14, and an output unit 15.

The communication unit 11 is a communication interface that transmits and receives various types of information to and from another device connected via a network or the like. The communication unit 11 is achieved by an NIC (Network Interface Card) or the like, and performs communication between another device via an electric communication line, such as a LAN (Local Area Network) or the Internet, and the control unit 14 (described later). For example, the communication unit 11 receives classification target operation logs via the network.

The input unit 12 is an input interface that accepts various operations from an operator of the classification device 10. For example, this unit includes input devices, such as a keyboard and a mouse.

The storage unit 13 is implemented as semiconductor memory elements, such as a RAM (Random Access Memory) and a flash memory, or storage devices, such as a hard disk and an optical disk, and stores a processing program that causes the classification device 10 to operate, and data used during execution of the processing program. The storage unit 13 stores operation log data 131.

The operation log data 131 includes multiple operation logs that describe operation content for windows of a terminal screen by each person in charge. Specifically, referring to FIG. 2, an example of operation content to a window of the terminal screen is described. FIG. 2 exemplifies a window of a terminal screen.

For example, it is assumed that business of accepting a service application by a customer includes work of registering information on the customer. It is assumed that at this time, a person in charge executes the following operation on a customer information registration screen shown in FIG. 2. First, the person in charge inputs "DENDEN TARO [proper noun]" in a text box "NAME". The person in charge then inputs " . . . Yokosuka City, Kanagawa Pref.", which is the address of the customer, in "ADDRESS". Subsequently, the person in charge selects "SERVICE A" in "SERVICE TYPE" field.

These operations fall into work of registering customer information, and are defined as work in the business of accepting a service application. A log describing operation content, in other words, an operation log, is a log obtained at the granularity of operations that is finer than that of work.

FIG. 3 illustrates the description content of the operation log. As shown in FIG. 3, the operation log includes the operation time, information identifying an operation target, and description content. Specifically, the information identifying an operation target is a window title, and an URL. The description content is description content in the operation target window.

FIG. 4 shows an example of the data configuration of the operation log data 131. The classification device 10 assigns each operation log an operation log ID, and accumulates multiple operation logs as operation log data 121.

As shown in a table T1 in FIG. 4, the operation log data 121 includes items of the operation log ID, the operation time, information identifying an operation target window, and description content. The operation log ID is a value unique to each operation log and is assigned when the operation log is accumulated. The operation time is a time at which the operation log is obtained. The information identifying an operation target is the window title of the operation target window, a URL, a file path, an application name, etc. The description content is text information in the operation target window.

For example, the operation log with an operation log ID "1" is an operation log obtained at "2019/03/27 13:15:32". The operation log with the operation log ID "1" has an operation target "https://www.shuccho_shinsei.html", and description content that is "BUSINESS TRIP APPLICATION SYSTEM, SECTION NAME, NAME OF PERSON IN CHARGE, BUSINESS TRIP DESTINATION; PLEASE ENTER BUSINESS TRIP ROUTE WITH LOWEST PRICE."

The control unit 14 controls the entire classification device 10. The control unit 14 is, for example, an electronic circuit, such as a CPU (Central Processing Unit) or an MPU (Micro Processing Unit), or an integrated circuit, such as an ASIC (Application Specific Integrated Circuit) or an FPGA (Field Programmable Gate Array). The control unit 14 includes an internal memory for storing a program defining various processing procedures, and control data, and executes various processes using the internal memory. The control unit 14 functions as various processing units by operations of various programs. The control unit 14 includes an obtainment section 141, a classification section 142, and an information display section 143 (information output section).

The obtainment section 141 obtains operation logs that describe operation content for a window on a terminal screen by the person in charge. The obtainment section 141 obtains an operation log that includes the operation time, the information identifying an operation target window, and description content in the operation target window. The obtainment section 141 obtains the description content of the operation target window in real time. Alternatively, the obtainment section obtains the description content of the operation target window using the information identifying an operation target window in non-real time. The obtainment section 141 assigns the obtained operation log an operation log ID, and stores the log in the storage unit 13.

The classification section 142 classifies the operation logs into multiple groups using a document classification method on the basis of the operation content of the operation logs. The classification section 142 uses, as a label, a word characteristic of each classified group, and assigns the label to the corresponding group.

The information display section 143 causes the output unit 15 to output the operation logs assigned the labels. The information display section 143 visualizes and displays the operation logs assigned the labels as a flowchart representing the process, or a diagram, such as a chart (e.g., graph) obtained by aggregating on a label-by-label basis.

The output unit 15 is, for example, a display, a printer or the like, and outputs various types of information. The output unit 15 displays and outputs a diagram processed by the information display section 143, onto a screen of the display, for example.

[Obtainment section] For example, timing at which the window to be operated by the person in charge is changed, and timing at which some operation is applied to a GUI (Graphical User Interface) in the operation screen are assumed as the timing of obtaining the operation log by the obtainment section 141. In other words, the obtainment section 141 obtains an operation log at the timing of operation by the person in charge.

The obtainment section 141 obtains the description content of the operation target window from the operation target window at the timing described above in real time. Alternatively, the obtainment section 141 can obtain the description content of the operation target window in non-real time by accessing the web page or a file on the basis of information identifying the operation target window (the window title, URL, file path, etc.). Furthermore, the obtainment section 141 can obtain the entire operation target window, or only the operation position, as the description content.

[Classification section] Next, the processes of the classification section 142 are described. For the process-target operation log obtained by the obtainment section 141, first, the classification section 142 divides text information on "DESCRIPTION CONTENT" corresponding to each ID of the operation log on a word-by-word basis, and creates vectors (hereinafter called operation log vectors) using a set of words in the description content of the operation log. The classification section 142 creates the word vector for each ID of the operation log using a method, such as the bag-of-words, TF-IDF or Word2Vec.

The classification section 142 may also adopt a method of creating a vector using only common words in the word set in the description content of the operation log. In this case, the following procedures are added instead of the procedures described above. First, the classification section 142 classifies the operation log with respect to each operation target window. The classification section 142 compares the same operation screens with each other on the basis of identification information on the operation screens of the operation logs. As described above, the classification section 142 compares all the operation logs of the operation target window, and extracts a set of common words, that is, a set of words appearing in every operation log. The classification section 142 then creates an operation log vector from the extracted set of words. The classification section 142 adopts this method, which can achieve highly accurate classification without being affected by words appearing in individual cases.

Subsequently, the classification section 142 classifies multiple operation logs into multiple groups using a document classification method on the basis of the operation log vector. The classification section 142 uses a clustering method, such as the topic model, X-means or K-means, as the document classification method. The number of groups to be classified can be set by automatic estimation, or manually set.

The classification section 142 then determines the label of each group. The classification section 142 extracts words characteristic of the respective groups, determines the extracted words as labels, and assigns the labels to the operation logs corresponding to the respective groups. The characteristic word is a word having a high rate of appearance in the appearance frequencies of words (hereinafter called "word distribution"). Alternatively, the characteristic word frequently appears only in specific groups, and is not present or present at a low frequency in the other groups.

For example, a case of using the topic model is described. When the classification section 142 classifies multiple operation logs into multiple groups using the topic model, this section obtains the distribution of appearance frequencies of words on a topic-by-topic basis. The classification section 142 extracts the word having a high rate of distribution on a topic-by-topic basis, as the label of the group. The classification section 142 then assigns the extracted label to the corresponding group.

The cases of using the clustering methods, such as X-means, are described. The classification section 142 classifies the multiple operation log into each group using the clustering method. Subsequently, the classification section 142 extracts, as the label of the group, the word having a high appearance frequency only in specific groups, and has not appeared yet or appears at a low frequency in the other groups. The classification section 142 then assigns the extracted label to the corresponding group.

[Specific examples of classification result] FIG. 5 shows an example of a classification result. In FIG. 5, it is assumed, as specific examples, that the person in charge performs business trip application business, and purchase application business, and an operation log shown in an upper part of FIG. 5 is obtained. A set of words in each operation log is exemplified. A frame F1 in a lower part of FIG. 5 indicates labels assigned by the classification section 142 to the respect groups of the operation log.

Here, in a case where the operation logs correspond to the same operation, it is conceivable that many common words appear. On the other hand, in a case of operation logs of different work activities, it is conceivable that words frequently appearing in the individual operation logs are different.

In the example in FIG. 5, in "BUSINESS TRIP APPLICATION SYSTEM ENTRY WORK" of "business trip application business", words related to the business trip application, such as underlined "BUSINESS TRIP, ROUTE, DEPARTURE, . . . " frequently appear. In "ROUTE CONFIRMATION WORK", words related to the route, such as boldfaced "ROUTE, TRANSIT, TIME, . . . ".

According to the above description, the classification section 142 performs classification on the basis of the set of words of the operation log, which can achieve classification into multiple groups at the granularity of work.

It is desired that the label assigned to each group have a name used only for the work so as to allow a person to grasp the work activity. Accordingly, a method is conceivable that words that have appearance frequencies in specific groups but do not appear or have low frequencies in other groups are adopted as labels. In the case in FIG. 5, in the business trip application system and the purchase application system, "NAME", "SECTION" and "SYSTEM" have high appearance frequencies, and appear in both the groups. Accordingly, they are unsuitable as labels.

On the other hand, words, such as underlined "BUSINESS TRIP, ROUTE, DEPARTURE, . . . ", boldfaced "ROUTE, TRANSIT, TIME, . . . " and boldfaced and italicized "PURCHASE, GOODS, AMOUNT, . . . " have high appearance frequencies in each group, and low appearance frequencies in the other groups. Accordingly, the classification section 142 adopts these words as words representing the work, that is, labels, thereby allowing the business analyzer to easily grasp which work the operation log of each group corresponds to.

[Information display section] Next, the processes of the information display section 143 are described. FIG. 6 shows an example of the data configuration of the operation logs assigned labels. As shown in a table T2 in FIG. 6, after classification by the classification section 142, the label field of each operation log is assigned the label of the group to which the operation log belongs. For example, the operation log having the operation log ID "1" is assigned "BUSINESS TRIP" as a label.

Figure 7:
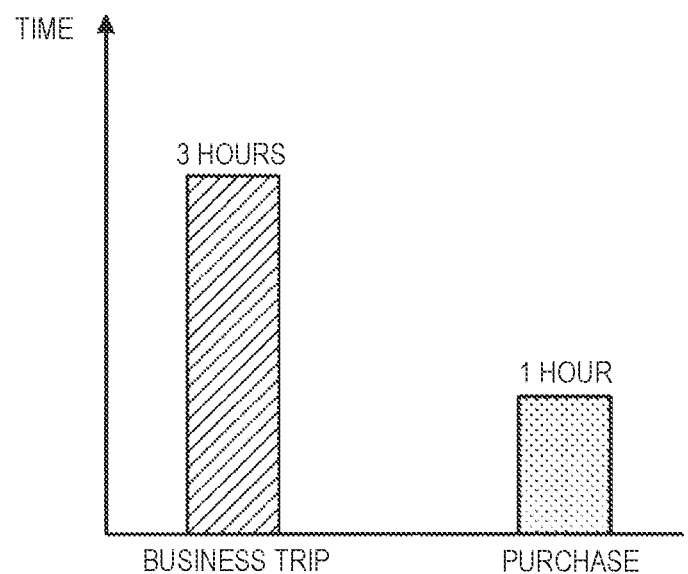
FIG. 7 shows an example of diagrams processed by an information display section.
Figure 8:
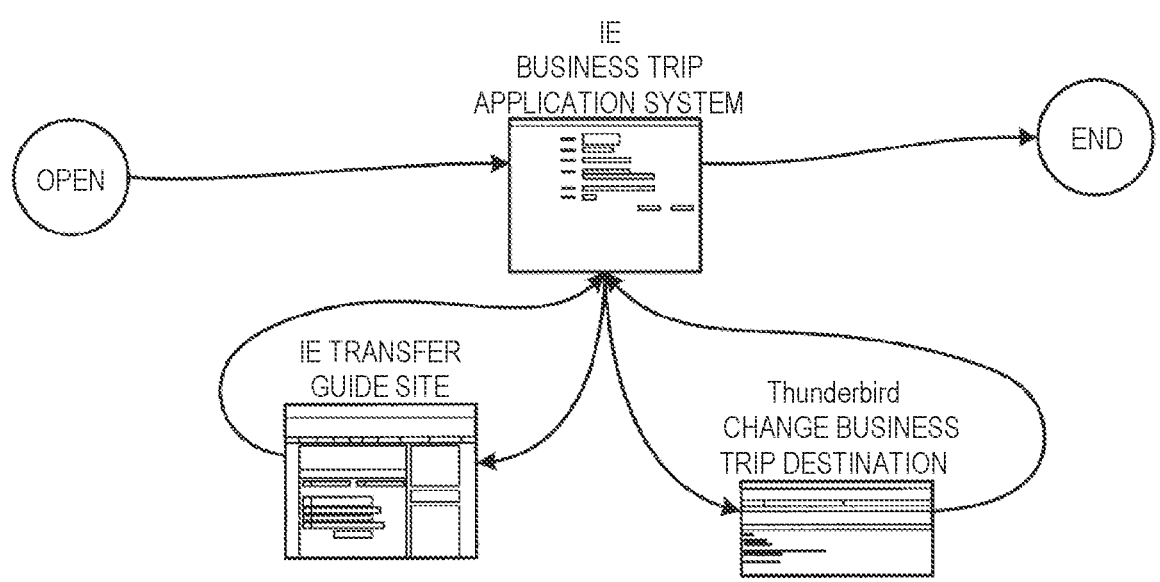
FIG. 8 shows an example of diagrams processed by the information display section.

FIGS. 7 and 8 show examples of diagrams processed by the information display section 143. As shown in FIG. 7, the information display section 143 processes the operation logs assigned the labels into a chart obtained by aggregating them on a label-by-label basis. For example, the information display section 143 displays the time in which the person in charge performs work related to the business trip on the basis of the operation logs assigned the "BUSINESS TRIP" label, and displays the time in which the person in charge performs work related to purchase on the basis of the operation logs assigned the "PURCHASE" label, as a chart. The business analyzer can grasp the time required for the work related to business trips and purchase only by viewing this chart.

As shown in FIG. 8, the information display section 143 processes the operation logs assigned the labels into a flowchart-formed diagram representing processes. For example, the information display section 143 extracts the operation logs assigned the business trip from the operation log data 131, and the work content from the start of the work related to the business trip to the end as the flowchart-formed diagram. The business analyzer can grasp the flow of the work related to the business trip by the person in charge, only by viewing the flowchart.

Figure 9:
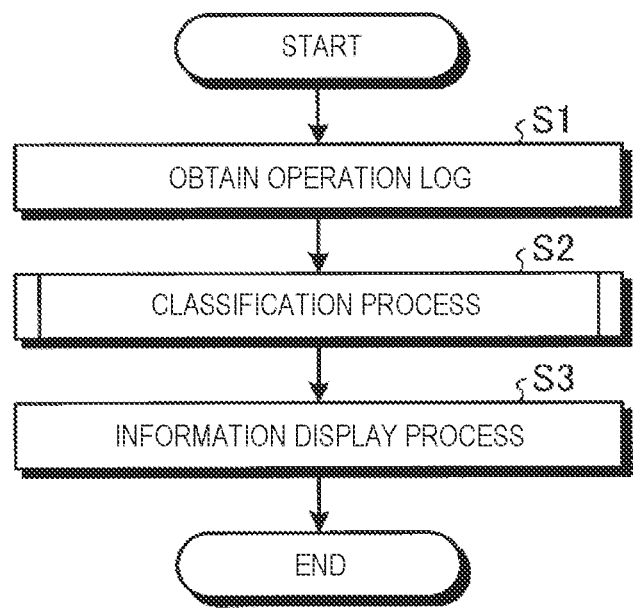
FIG. 9 is a flowchart showing processing procedures of a classification process according to Embodiment 1.

[Flow of processes] Next, referring to FIG. 9, the processing procedures of a classification process executed by the classification device 10 are described. FIG. 9 is a flowchart showing processing procedures of the classification process according to Embodiment 1.

As shown in FIG. 9, the obtainment section 141 obtains an operation log that describes operation content for the window of the terminal screen by the person in charge (step S1). The classification section 142 classifies the operation logs into multiple groups on the basis of the operation content of the operation logs obtained by the obtainment section 141, and performs the classification process of assigning the labels (step S2). The information display section 143 performs an information display process of causing the output unit 15 to output the operation logs assigned the labels (step S3).

Figure 10:
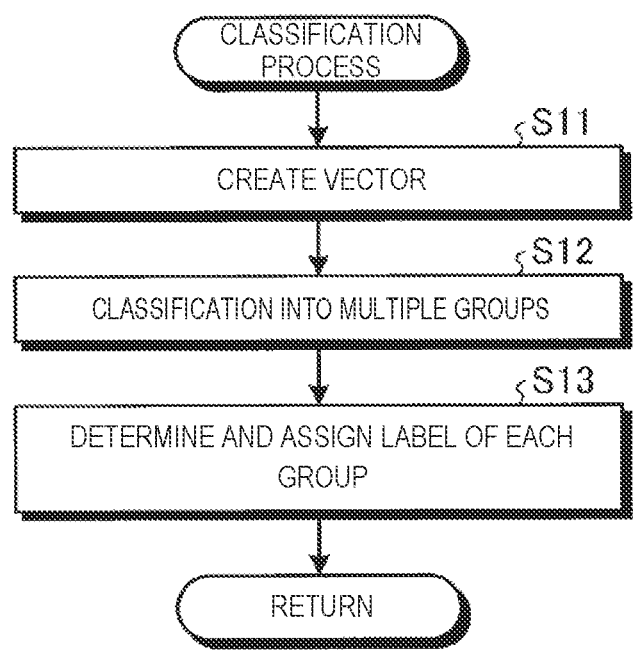
FIG. 10 is a flowchart showing processing procedures of the classification process shown in FIG. 9.

[Flow of classification process] Next, the processing procedures of the classification process (step S2) shown in FIG. 9 are described. FIG. 10 is a flowchart showing the processing procedures of the classification process shown in FIG. 9.

The classification section 142 creates an operation log vector using the set of words in the description content of the operation log (step S11). Subsequently, the classification section 142 classifies multiple operation logs into multiple groups using the document classification method on the basis of the operation log vector (step S12). The classification section 142 then extracts words characteristic of the respective groups, determines the extracted words as labels, and assigns the labels to the operation logs corresponding to the respective groups (step S13).

[Effects of Embodiment 1] As described above, the classification device 10 according to Embodiment 1 obtains the operation log that describes operation content for the terminal screen by the person in charge. The classification device 10 then classifies the operation logs into multiple groups using the document classification method on the basis of the operation content of the operation log, and assigns words characteristic of the respective groups as labels to these groups. The classification device 10 then causes an output device to output the operation logs assigned the labels.

Consequently, according to Embodiment 1, the operation logs are classified into multiple groups, and the labels are automatically assigned, which can reduce cumbersome manual work.

The words characteristic of the respective groups extracted as the labels by the classification device 10 can be regarded as words that represent work including the operations described in the operation logs, as described above. Thus, the classification device 10 assigns the words representing the work, as labels, to the respective groups of the operation logs.

Consequently, the business analyzer can easily extract only the operation logs for the specific work by referring to the labels, thereby allowing business analysis focusing only on the specific work to be achieved. Consequently, the classification device 10 allows the business analyzer to easily grasp actual business activities at the granularity of work, from the operation logs.

The classification device 10 converts the operation content described in each operation log into the chart obtained by aggregating on a label-by-label basis, and causes the output unit 15 to output the chart. The business analyzer can grasp the time required for the work related to business trips and purchase only by viewing this chart. The classification device 10 converts the operation content items of the operation logs assigned the same label into the flowchart where the items are arranged in the processing order, and causes the output unit 15 to output the flowchart. The business analyzer can grasp the flow of the work related to the business trip by the person in charge, only by viewing the flowchart.

[Embodiment 2] Next, Embodiment 2 is described. This Embodiment 2 preliminarily classifies business documents into multiple groups, and assigns words characteristic of the respective groups as labels. This Embodiment 2 can easily grasp the actual business activities at the granularity of business, from the operation log, by classifying the process-target operation logs into individual groups of the business documents.

Figure 11:
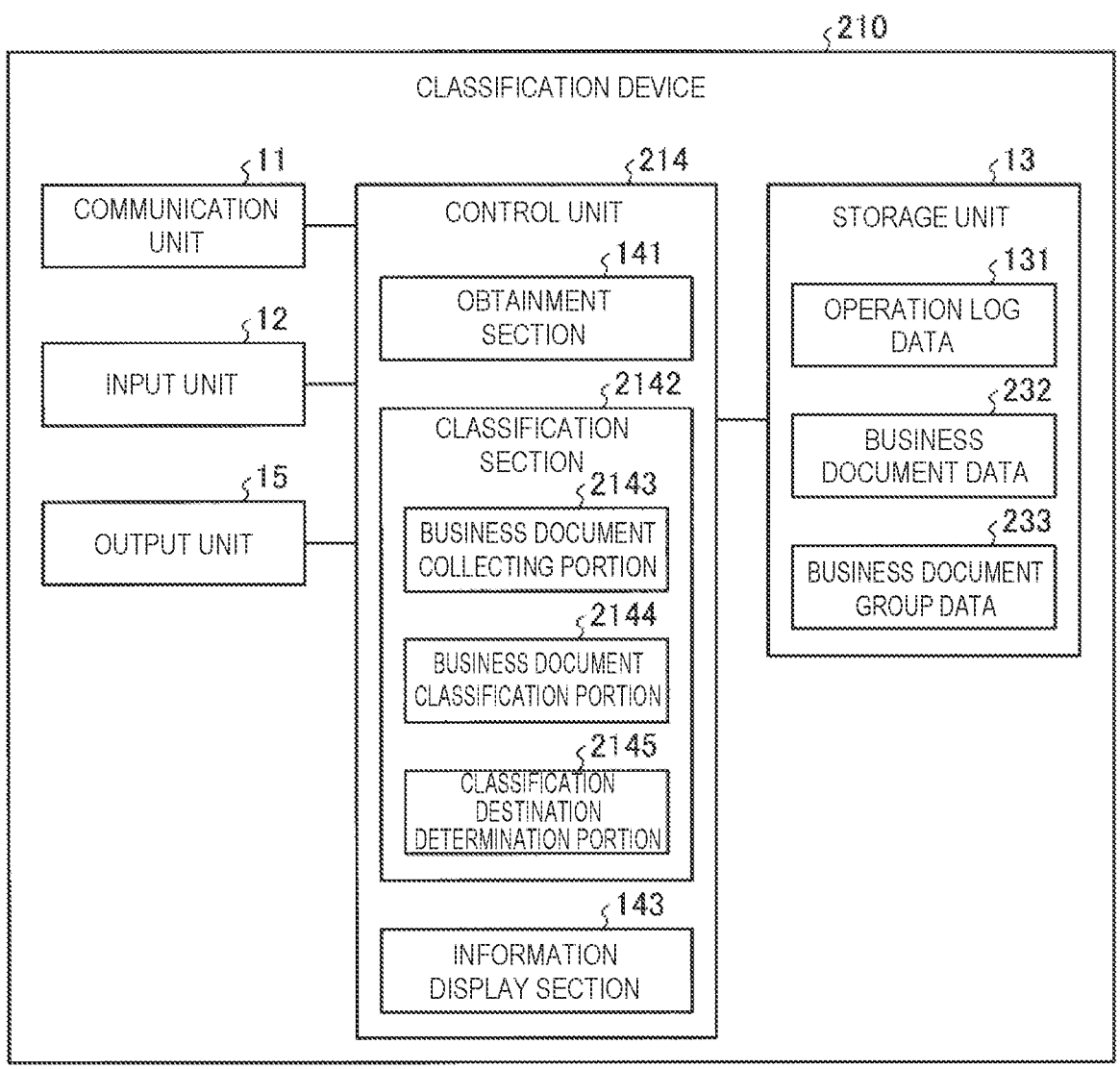
FIG. 11 is a block diagram showing an example of a configuration of a classification device according to Embodiment 2.

[Configuration of classification device] FIG. 11 is a block diagram showing an example of the configuration of a classification device according to Embodiment 2. As shown in FIG. 11, unlike the classification device 10, the classification device 210 according to Embodiment 2 includes a storage unit 13 that further stores business document data 232, and business document group data 233. The classification device 210 includes control unit 214 that has a function similar to that of the control unit 14, instead of the control unit 14.

The business document data 232 includes business documents, such as a business manual preliminarily kept in a cooperation and the like. FIG. 12 shows an example of the data configuration of the business document data 232. The classification device 210 assigns each business document and business document ID, and accumulates multiple business documents as the business document data 232.

As shown in a table T11 in FIG. 12, the business document data 232 includes items of the business document ID, title, file path/URL, and description content. The business document ID is a value that is unique to each business document and is assigned when the business document is accumulated. The title is the file name of the business document or the title of a website. The file path/URL is a file path or an URL of the business document. The description content is text information described in the business document.

For example, the operation log with the business document ID "1" has a title "TRAVEL EXPENSE REQUEST ISSUANCE MANUAL", is displayed at URL "https://company.co.jp/ryohi_manual", and has description content "AS TO METHOD OF BUSINESS TRIP APPLICATION, PLEASE USE TRAVEL EXPENSE REQUEST ISSUANCE SYSTEM FOR DAY TRIP. ACCESS IS ALLOWED AT URL XX."

The business document group data 233 includes information on preliminarily grouped business documents. The business document group data 233 is information about groups of business documents that have been preliminarily classified into multiple groups on the basis of the business content of the business documents, and assigned words characteristic of the respective groups as labels.

FIG. 13 shows an example of the data configuration of business document group data 233. As shown in a table T12 in FIG. 13, the business document group data 233 is information that associates the business document IDs with the labels of the groups into which the respective business documents are classified.

For example, the business document with the business document ID "1" is assigned a "BUSINESS TRIP" label.

For example, the business document with the business document ID "2" is assigned a "PURCHASE" label. The labels are assigned to the respective groups of the business documents by a business document classification portion 2144 (described later).

The control unit 214 includes a classification section 2142 instead of the classification section 142. The classification section 2142 classifies the operation logs into the individual groups of the business documents, based on description content of the operation logs, and assigns the labels of the corresponding groups to the operation logs. The classification section 2142 includes a business document collection portion 2143, a business document classification portion 2144 (second classification section), and a classification destination determination portion 2145 (first classification section).

The business document collection portion 2143 collects business documents in web sites and file systems using the crawling technology. For example, the business document collection portion 2143 can obtain the paths of documents and the URLs of web sites, and the file names of the documents and the title names of the web sites, using, for example, S2robot or Nutch as a commercially available crawling technology.

The business document classification portion 2144 preliminarily classifies the business documents into a plurality of groups, using the document classification method, based on the business content of the business documents, and assigns words characteristic of the respective groups as labels to these groups.

The classification destination determination portion 2145 classifies the process-target operation logs into the multiple groups of the business documents, based on the description content of the operation logs obtained by the obtainment section 141. The classification destination determination portion 2145 determines the labels of the corresponding groups as labels to be assigned to the operation logs, and assigns the labels to the operation logs.

[Processes for business documents] The processes of the business document collection portion 2143 and the business document classification portion 2144 can be performed independent of the classification process of the obtainment section 141 and the classification destination determination portion 2145. Specifically, the processes for the business documents by the business document collection portion 2143 and the business document classification portion 2144 are executed as preprocesses of the processes for the operation logs by the obtainment section 141 and the classification destination determination portion 2145. Accordingly, the processes for the business documents are described.

First, the business document collection portion 2143 collects business documents, and then the business document classification portion 2144 creates vectors on the basis of the description content of the business documents. The business document classification portion 2144 classifies the business documents into multiple groups using the document classification method on the basis of the created vectors. The business document classification portion 2144 extracts words characteristic of the respective groups, and adopts the words as the labels of the groups.

The words characteristic of the respective groups are words that have a high rate of word distribution in the business documents, and words that frequently appear only in specific groups but are not present or infrequently appear in the other groups. Accordingly, the business document classification portion 2144 adopts these words as words representing the business of the business documents, that is, labels, thereby allowing the business analyzer to easily grasp which business the business documents of each group correspond to, without the business analyzer themself performing processes. Note that the processes of the business document collection portion 2143 are similar to the processes performed for the operation logs by the classification section 142 in Embodiment 1, and are different only in processing target.

As for the business documents, the business document classification portion associates the business document IDs identifying the business documents with the labels assigned to the groups into which the business documents are classified, and stores them as the business document group data 233 in the storage unit 13.

[Classification destination determination portion] Next, the processes of the classification destination determination portion 2145 are described. The classification destination determination portion 2145 determines which group of the business document set the operation logs belong to, on the basis of the description content of the operation logs.

For the process-target operation logs obtained by the obtainment section 141, first, the classification destination determination portion 2145 divides text information on "DESCRIPTION CONTENT" corresponding to each ID of the operation log on a word-by-word basis, and creates operation log vectors using a set of words in the description content of the operation log. The classification destination determination portion 2145 creates word vectors for each ID of the operation log using a method, such as the bag-of-words, TF-IDF or Word2Vec.

The classification destination determination portion 2145 may adopt a method of creating a vector using only common words in the word set in the description content of the operation log. In this case, the following procedures are added instead of the procedures described above. First, the classification destination determination portion 2145 classifies the operation log with respect to each operation target window. The classification destination determination portion 2145 compares the same operation screens with each other on the basis of identification information on the operation screens of the operation logs. As described above, the classification destination determination portion 2145 compares all the operation logs of the operation target window, and extracts a set of common words, that is, a set of words appearing in every operation log. The classification destination determination portion 2145 then creates an operation log vector from the extracted set of words. The classification destination determination portion 2145 adopts this method, which can achieve highly accurate classification without being affected by words appearing in individual cases.

Subsequently, the classification destination determination portion 2145 determines which group created by the preparation the operation log vector belongs to, and assigns the process-target operation log the label of the corresponding group.

For example, a case of using the topic model is described. When the business documents are classified into the multiple groups using the topic model, the classification destination determination portion 2145 holds information on which group the words described in the business document highly probably belongs to. Accordingly, the classification destination determination portion 2145 adds up the probabilities of the words belonging to the groups, using the word vectors, and determines the group having the highest value as the group to which the operation log belongs. The classification destination determination portion 2145 then assigns the determined group to the process-target operation log.

The cases of using the clustering methods, such as X-means or K-means, are described. When the classification destination determination portion 2145 classifies the business documents using the method, such as X-means or K-means, this portion can obtain the barycenter of each group. Accordingly, the classification destination determination portion 2145 calculates the distance between the vector of the word and the barycenter of each group, and determines the group having the minimum distance as the group of the operation log. The classification destination determination portion 2145 then assigns the determined group to the process-target operation log.

A method of using the k-NN method is described. The classification destination determination portion 2145 calculates the closeness between the operation log and each document using the k-NN method, and determines the group to which the top k closest cases belong, as the group of the operation log. The classification destination determination portion 2145 then assigns the determined group to the process-target operation log.

[Specific example of classification destination determination result] Here, business documents on specific business include many words common to the specific business. Accordingly, the business documents can be classified with respect to high appearance frequencies, thereby allowing the business documents to be classified on a business-by-business basis.

The business documents on specific business include not only words common to the specific business, but also specific operations related to the business, or what includes words specific to operation targets, i.e., work. Words commonly appearing at the same operation in the operation log obtained at the specific operation are compared with words in the business document, thereby allowing the operation log and the business document to be associated with each other.

According to the above description, by classifying the operation log into the classification destination business of the associated business document, even the operation logs that have different operations or operation targets, and largely different word appearance frequencies can be classified into the same business.

Figure 14:
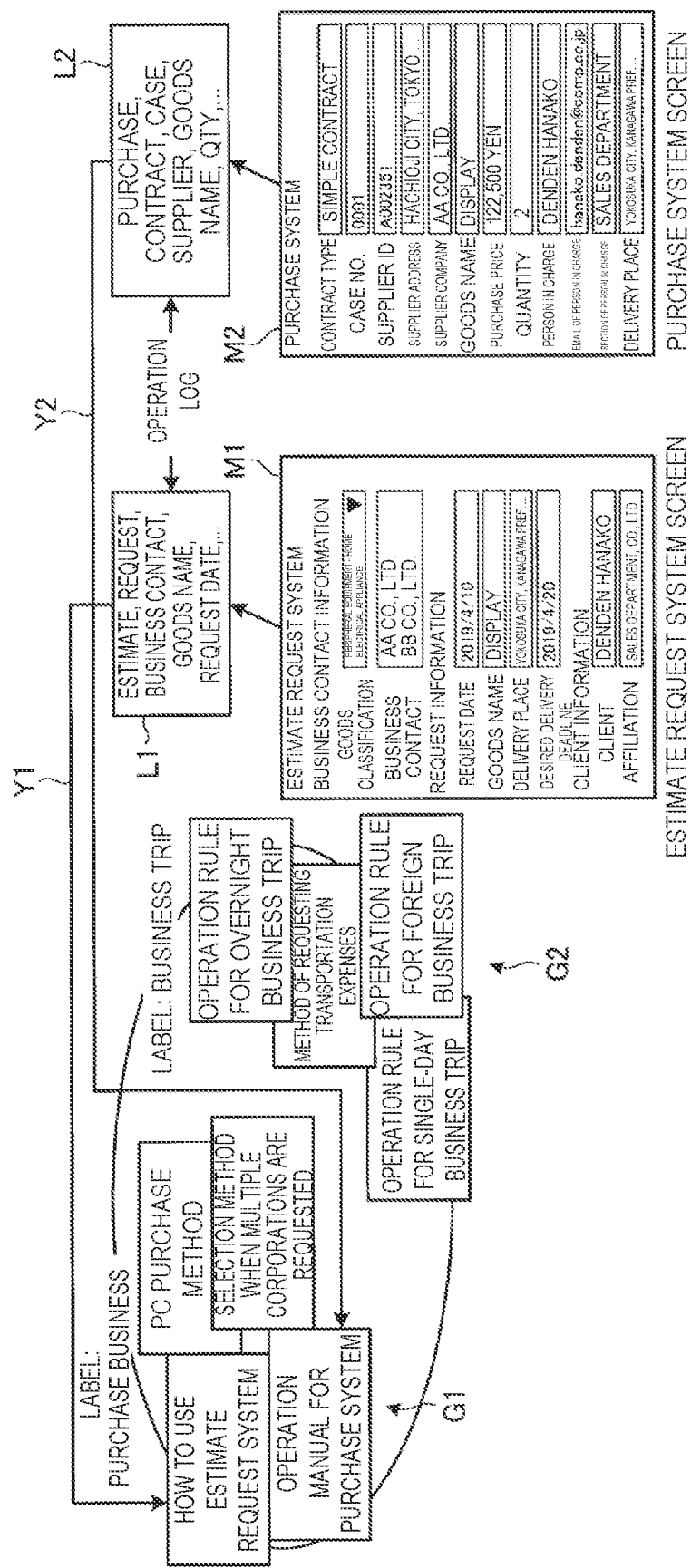
FIG. 14 shows an example of a classification destination determination result.

Hereinafter, description is made using a specific example. FIG. 14 shows an example of a classification destination determination result. Articles purchasing business is assumed to include an operation using an estimation request system, and an operation using a purchase system. Operation logs by obtaining operations executed on these systems include operation positions and pieces of text information on the operation screen.

In the classification section 2142, first, the business document classification portion 2144 classifies the business documents according to the description content of the documents; as shown in FIG. 14, the documents are classified into two groups that are a "PURCHASE BUSINESS" group G1, and a "BUSINESS TRIP" group G2. A case where the classification destination determination portion 2145 classifies the operation logs L1 and L2 into business types is then described. Operation logs that are obtainable from an "ESTIMATION REQUEST SYSTEM" screen M1 and a "PURCHASE SYSTEM" screen M2 often include words common to the words in the business documents classified into "PURCHASE BUSINESS" group G1. Accordingly, the classification destination determination portion 2145 classifies the operation logs L1 and L2 as operation logs of "PURCHASE BUSINESS" (see arrows Y1 and Y2).

According to the above description, the classification destination determination portion 2145 compares words appearing in the operation logs with the words in the business documents, and determines which group of business documents the operation logs belong to. Accordingly, this portion can classify the operation logs at the granularity of business.

Figure 15:
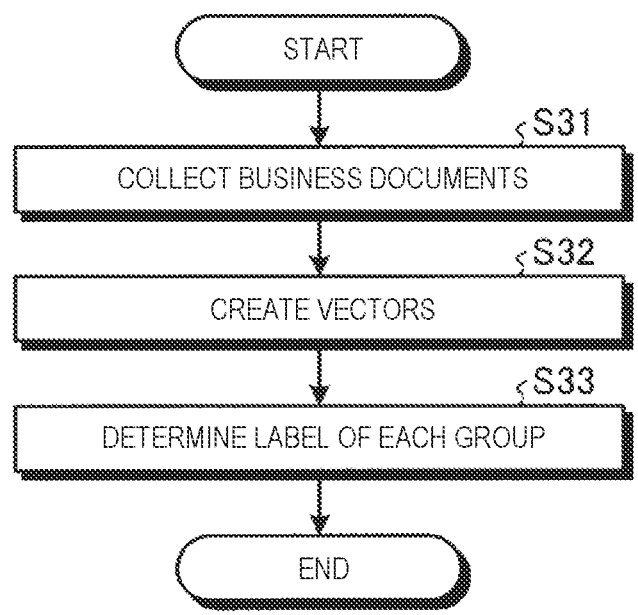
FIG. 15 is a flowchart showing processing procedures of a business document classification process according to Embodiment 2.

[Flow of classification process for business documents] Next, referring to FIG. 15, the processing procedures of a business document classification process executed by the classification device 210 are described. FIG. 15 is a flowchart showing processing procedures of the business document classification process according to Embodiment 2. The business document classification process is executed before the classification process for the operation logs.

First, as shown in FIG. 15, the business document collection portion 2143 collects business documents in web sites and file systems using the crawling technology (step S31). After the business document collection portion 2143 collects business documents, the business document classification portion 2144 creates vectors on the basis of the description content of the business documents (step S32).

The business document classification portion 2144 classifies the business documents into a plurality of groups on the basis of the created vectors, determines words characteristic of the respective groups as labels, and assigns the labels to the respective corresponding groups (step S33).

Figure 16:
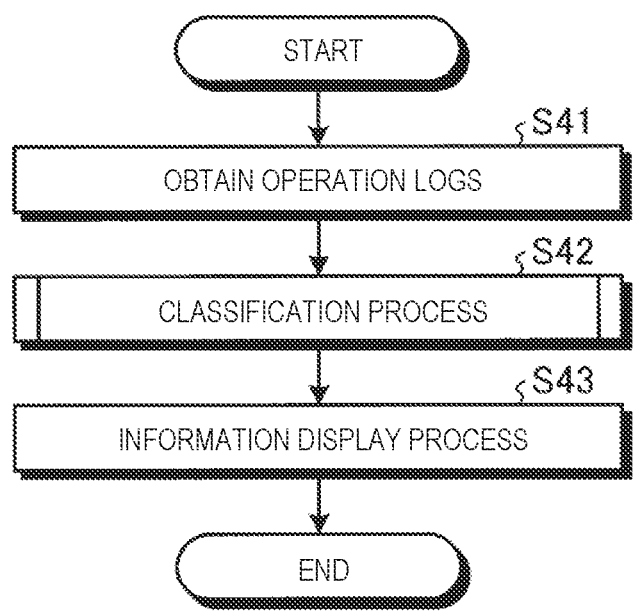
FIG. 16 is a flowchart showing processing procedures of a classification process according to Embodiment 2.

[Flow of classification process for operation logs] Next, referring to FIG. 16, the processing procedures of the classification process for the operation logs executed by the classification device 210 are described. FIG. 16 is a flowchart showing processing procedures of the classification process according to Embodiment 2.

Step S41 shown in FIG. 16 is a process identical to that of step S1 shown in FIG. 9. The classification destination determination portion 2145 performs the classification process of classifying which group among multiple groups of the business documents the operation logs obtained by the obtainment section 141 belongs to, on the basis of the description content of the operation logs (step S42). Step S43 shown in FIG. 16 is a process identical to that of step S3 shown in FIG. 9.

Figure 17:
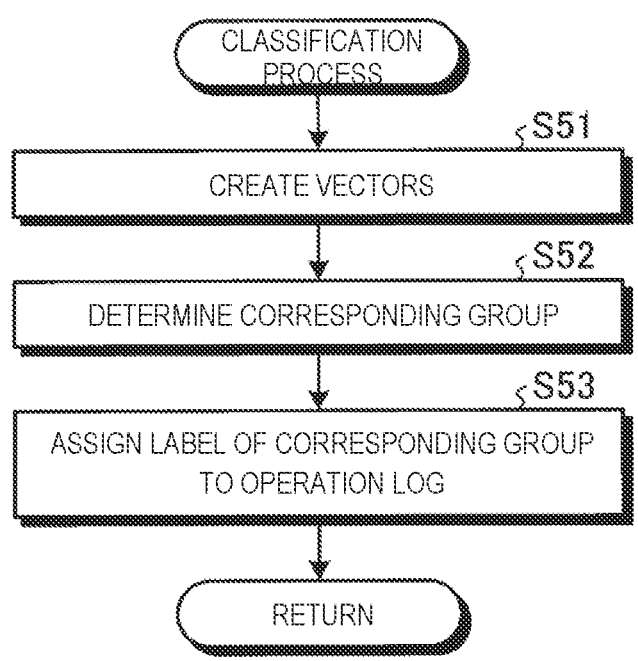
FIG. 17 is a flowchart showing processing procedures of the classification process shown in FIG. 16.

[Flow of classification process] Next, the processing procedures of the classification process (step S42) shown in FIG. 16 are described. FIG. 17 is a flowchart showing the processing procedures of the classification process shown in FIG. 16.

The classification destination determination portion 2145 creates an operation log vector using the set of words in the description content of the operation log (step S51). The classification destination determination portion 2145 determines which group among multiple groups of business documents the process-target operation log belongs to, on the basis of the created operation log vector (step S52). The classification destination determination portion 2145 determines the labels of the corresponding groups as labels to be assigned to the operation logs, and assigns the labels to the operation logs (step S53).

[Effects of Embodiment 2] As described above, the classification device 210 according to Embodiment 2 holds information about groups of business documents that have been preliminarily classified into multiple groups on the basis of the business content of the business documents, and assigned words characteristic of the respective groups as labels. The classification device 210 obtains operation logs that describe operation content for a window of the terminal screen by the person in charge. The classification device 210 then classifies the operation logs into the individual groups of the business documents, based on description content of the operation logs, and assigns the labels of the corresponding groups to the operation logs. The classification device 210 then causes the output unit 15 to output the operation logs assigned the labels.

Figure 18:
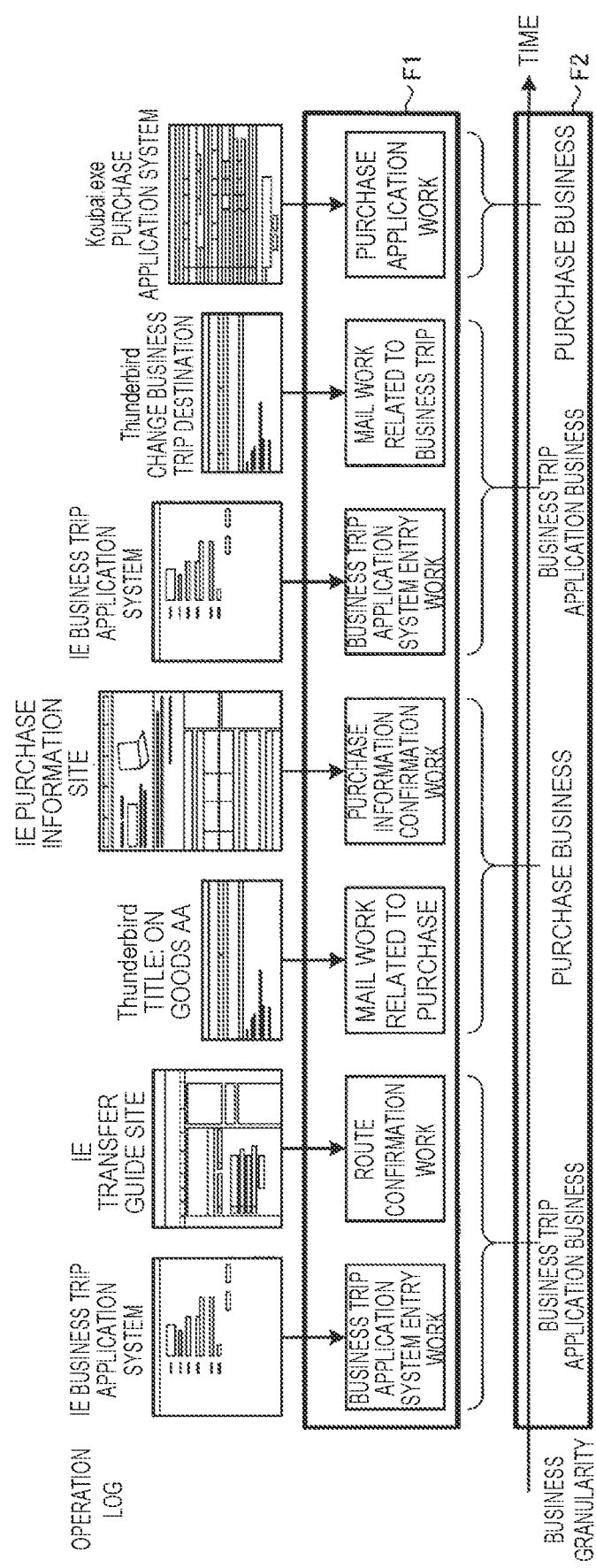
FIG. 18 shows an example of a classification result.

FIG. 18 shows an example of a classification result. For example, provided that there is a person in charge dealing with multiple business activities, such as business trip application business and purchase application business, the business analyzer is assumed to intend to grasp the actual business activities of the person in charge. The person in charge executes business on various business systems and websites/files according to the flow shown in FIG. 18, and the operation logs at the time are obtained. Information on the operation logs is the operation time period, information on the operation screen, and information on the operation position. The granularity of the information on the operation logs themselves is too fine. Accordingly, grasping at the granularity of business is difficult.

Conventionally, for grasping at the granularity of business, the business analyzer understands the meaning of the operation log, determines which business the operation is for, and assigns a label.

On the other hand, the classification device 210 preliminarily classifies business documents into multiple groups, and assigns words characteristic of the respective groups as labels. The classification device 210 classifies the process-target operation log into group of the business documents, and assigns a label. That is, the classification device 210 classifies the operation log into the group of the business documents, and automatically assigns the label, which can reduce cumbersome manual work.

A frame F2 in a lower part of FIG. 18 indicates labels assigned to the operation logs by the classification destination determination portion 2145. The labels are labels that indicate which groups of the business documents the operation logs belong to, and indicate which business the operation logs belong to. Accordingly, by confirming the label assigned to the operation log, the business analyzer can easily grasp the actual business activities at the granularity of business. That is, the classification device 210 can grasp the actual business activities at the granularity of "business", which is rougher than that of "work" (see the frame F1 in FIG. 18) classified by the classification device 10.

Example 1

A method of the classification section 142 in the classification device 10 or the business document classification portion 2144 in the classification device 210 classifying the operation logs or the business documents, and extracting labels, is specifically described.

For example, a method is described of the classification section 142 or the business document classification portion 2144 performing classification and label extraction of words in the individual operation logs or the description content of the business documents using the topic model. Hereinafter, the processes for the operation logs by the classification section 142 are exemplified and described. The processes of the business document classification portion 2144 for the business documents are similar to the processes of the classification section 142 for the operation logs.

In the case of the Japanese language, the classification section 142 uses MeCab for a method of dividing description content into words. A commercially available API (Application Programming Interface) is used for a method of classification and label extraction through the topic model.

First, in a first process, the classification section 142 divides text information described in the operation log on a word-by-word basis using MeCab or the like. For example, in a case of "PLEASE MAKE REQUEST FOR TRANSPORTATION EXPENSES REIMBURSEMENT WITH AN ACTUALLY USED ROUTE.", division is made such that [TRANSPORTATION, EXPENSES, HA [Japanese particle], ACTUAL, LY, USE, D, ROUTE, WO [Japanese particle], REQUEST, MAKE, TE [Japanese particle], PLEASE].

Subsequently, in a second process, the classification section 142 vectorizes each operation log using weighting with the word appearance frequency (BoW) or TF-IDF. FIGS. 19 and 20 show examples of the operation log vectors.

For example, in the case of BoW, it is represented as "(word (indicated by an ID in actuality), appearance frequency)".
The word is represented as an ID (numeral) by dictionary=Dictionary(sen_list).
The word appearance frequency is aggregated by corpus= [dictionary.doc2bow(text) for text in sen_list]
As a result, an operation log vector shown in FIG. 19 is created.

In the case of TF-IDF, it is represented as "(word (an ID in actuality), weight)".
The TFIDF value of each word of each operation log is calculated by
model=TfidfModel(corpus).
As a result, an operation log vector shown in FIG. 20 is created.

In a third process, the classification section 142 classifies the operation log by the topic model. The number of groups with the maximum value is automatically set by what evaluates the quality of the number of groups to be classified (Coherence function), as the number of groups. Alternatively, the business analyzer may designate the number of classifications. A topic model (classification into two groups) is constructed by lda=LdaModel(corpus=corpus, num_topics=2, id2word=dictionary).

FIG. 21 shows an example of a classification result of the operation log according to the topic model. FIG. 21 shows an analysis result (0 or 1) and a word string, as a result example. Note that for the sake of easy understanding, only words are indicated. However, in actuality, data for the second process is used.

In a fourth process, the classification section 142 extracts, as a label, a word characteristic of each group, and assigns the label to the corresponding group. In the case of the topic model, the distribution of words in each group is calculated. Accordingly, what has a high distribution rate can be adopted as the label. For example, the classification section 142 assigns a group 1 "TRANSPORTATION" label, and assigns a group 2 "PURCHASE" label.

Example 2

Next, a method is described of the classification section 142 or the business document classification portion 2144 performing vectorization of words in the individual operation logs or the description content of the business documents, and classification and label extraction of these words using a clustering method, such as X-means. Hereinafter, the processes for the operation logs by the classification section 142 are exemplified and described. The processes of the business document classification portion 2144 for the business documents are similar to the processes of the classification section 142 for the operation logs.

In the case of the Japanese language, the classification section 142 uses MeCab for a method of dividing description content into words. The clustering method uses K-means or X-means from among commercially available APIs.

First, in a first process, the classification section 142 divides text information described in the operation log on a word-by-word basis using MeCab or the like. For example, in a case of "PLEASE MAKE REQUEST FOR TRANSPORTATION EXPENSES REIMBURSEMENT WITH AN ACTUALLY USED ROUTE." division is made such that [TRANSPORTATION, EXPENSES, HA [Japanese particle], ACTUAL, LY, USE, D, ROUTE, WO [Japanese particle], REQUEST, MAKE, TE [Japanese particle], PLEASE].

Subsequently, in the second process, the classification section 142 weights each operation log with the word appearance frequency (BoW) or TF-IDF, and vectorizes it using Word2Vec. FIGS. 22 and 23 show examples of the operation log vectors.

For example, in the case of BoW, it is represented as "(word (indicated by an ID in actuality), appearance frequency)".
The word is represented as an ID (numeral) by dictionary=Dictionary(sen_list).
The word appearance frequency is aggregated by corpus=[dictionary.doc2bow(text) for text in sen_list]
As a result, an operation log vector shown in FIG. 22 is created.

In the case of TF-IDF, it is represented as "(word (an ID in actuality), weight)".
The TFIDF value of each word of each operation log is calculated by
model=TfidfModel(corpus).
As a result, an operation log vector shown in FIG. 23 is created.

In the third process, the classification section 142 classifies operation logs into multiple groups using the X-means. The X-means automatically estimates the number of groups. Alternatively, the number of groups may be manually set, and the logs may be classified into multiple groups using K-means.

FIG. 24 shows an example of a classification result of operation logs according to the X-means. FIG. 24 shows an analysis result (0 or 1) and a word set word string of the operation logs, as a result example.

In the fourth process, the classification section 142 extracts the label of each group. At this time, the classification section 142 collects words in the operation logs in each group, and extracts, as labels, words that frequently appear in various operation logs in a specific group but do not appear in the other groups. For example, a group 1 is assigned "TRANSPORTATION" label, and a group 2 is assigned "PURCHASE" label.

[System configuration of embodiment] Each configuration element of the classification devices 10 and 210 shown in FIGS. 1 and 11 is represented as a functional concept, and is not necessarily physically configured to be what is shown in the diagrams. That is, the specific modes of distribution and integration of functions of the classification devices 10 and 210 are not limited to those shown in the diagrams. Alternatively, some or entire parts thereof can be configured in a functionally or physically distributed or integrated manner in any units in conformity with various loads and use situations.

Some or all of the processes performed in the classification devices 10 and 210 may be achieved by a CPU or programs that are to be analyzed or executed by a CPU. Alternatively, the processes executed in the classification device 10 may be achieved as hardware made of wired logic.

Some or all of the processes described in each embodiment having been described to be automatically performed can be manually performed. Alternatively, some or all of the processes having been described to be manually performed can be performed automatically by a publicly known method. Furthermore, the described and illustrated processing procedures, control procedures, specific names, and information including various data items and parameters can be appropriately changed unless specifically noted.

Figure 25:
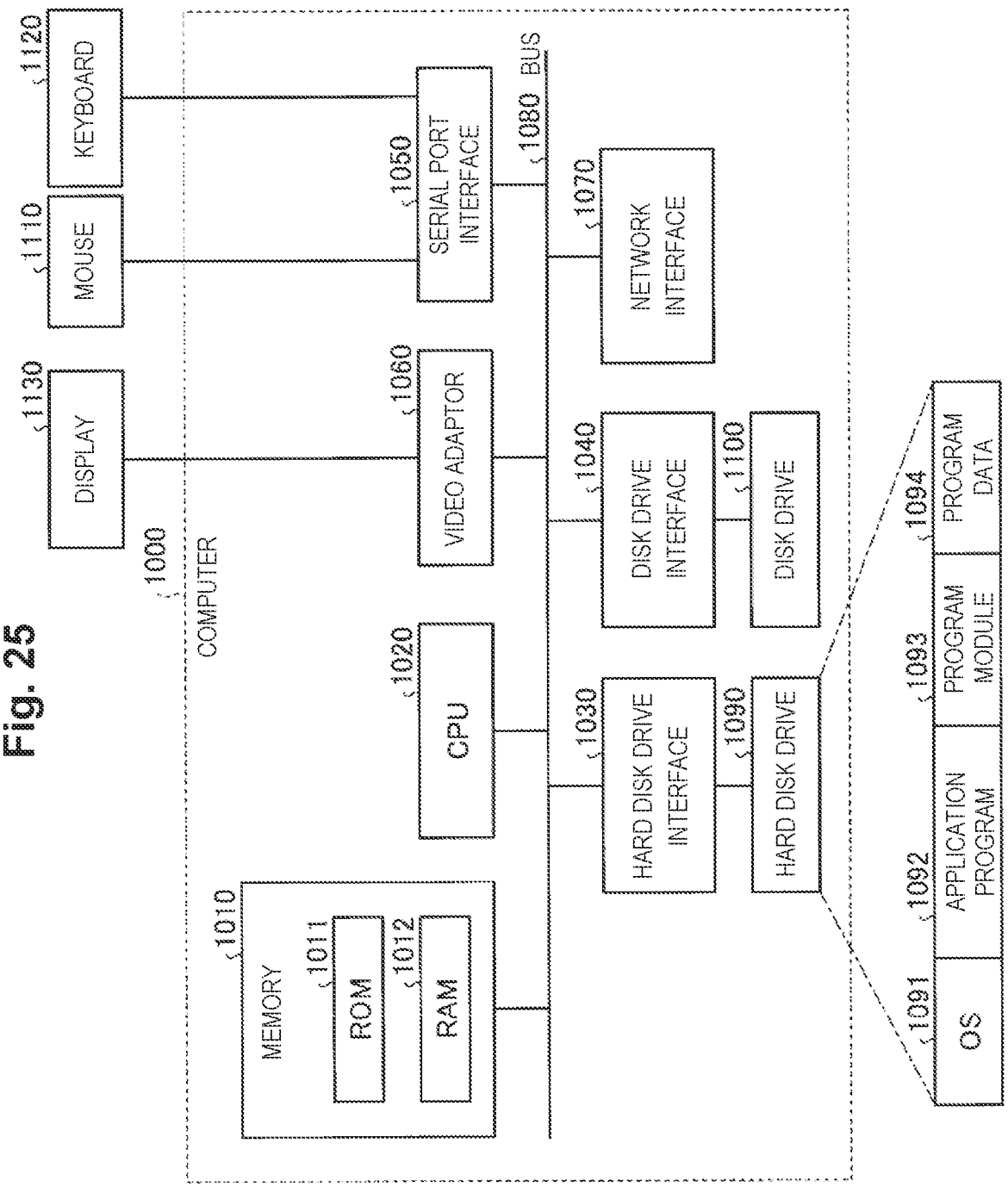
FIG. 25 shows an example of a computer that executes a program to thereby achieve the classification device.

[Program] FIG. 25 shows an example of a computer that executes a program to thereby achieve the classification devices 10 and 210. A computer 1000 includes, for example, a memory 1010, and a CPU 1020. The computer 1000 includes a hard disk drive interface 1030, a disk drive interface 1040, a serial port interface 1050, a video adapter 1060, and a network interface 1070. These elements are connected to each other by a bus 1080.

The memory 1010 includes a ROM 1011, and a RAM 1012. The ROM 1011 stores a boot program, such as a BIOS (Basic Input Output System). The hard disk drive interface 1030 is connected to a hard disk drive 1090. The disk drive interface 1040 is connected to a disk drive 1100. For example, a removable storage medium, such as a magnetic disk or an optical disk, is inserted into the disk drive 1100. The serial port interface 1050 is connected to a mouse 1110 and a keyboard 1120, for example. The video adapter 1060 is connected to a display 1130, for example.

The hard disk drive 1090 stores, for example, an OS (Operating System) 1091, an application program 1092, a program module 1093, and program data 1094. That is, the programs defining the classification devices 10 and 210 are implemented as the program module 1093 that describes code executable by the computer 1000. The program module 1093 is stored in the hard disk drive 1090, for example. For example, the program module 1093 for executing processes similar to those of functional components of the classification devices 10 and 210 is stored in the hard disk drive 1090. Note that the hard disk drive 1090 may be replaced with an SSD (Solid State Drive).

Setting data used for the processes of the embodiments described above is stored as the program data 1094 in the memory 1010 or the hard disk drive 1090, for example. The CPU 1020 reads the program module 1093 and the program data 1094 stored in the memory 1010 or the hard disk drive 1090 into the RAM 1012, and executes the module and data, as required.

Note that the program module 1093 and the program data 1094 are not necessarily stored in the hard disk drive 1090. Alternatively, for example, the module and data may be stored in a removable storage medium, and read by the CPU 1020 via the disk drive 1100. Alternatively, the program module 1093 and the program data 1094 may be stored in another computer connected via a network (LAN (Local Area Network), WAN (Wide Area Network) or the like). The program module 1093 and the program data 1094 may be read by the CPU 1020 from another computer via the network interface 1070.

The embodiments to which the invention made by the present inventor has thus been applied. However, the present invention is not limited by the description and the drawings that form a part of the disclosure of the present invention through the present embodiments. That is, all of other embodiments, examples, operation techniques and the like made by those skilled in the art or the like on the basis of the present embodiments are encompassed by the scope of the present invention.

REFERENCE SIGNS LIST 10, 210 Classification device
11 Communication unit
12 Input unit
13 Storage unit
14, 214 Control unit
15 Output unit
131 Operation log data
141 Obtainment section
142, 2142 Classification section
143 Information display section
232 Business document data
233 Business document group data
2143 Business document collection portion
2144 Business document classification portion
2145 Classification destination determination portion

The invention claimed is:

1. A classification device comprising:
processing circuitry configured to:
obtain operation logs describing operation content for a window on a terminal screen;
for each operation log of the obtained operation logs, generate a vector using words from the operation content for the operation log;
classify, using a document classification method, a label to each group of a plurality of groups by (i) identifying a first frequency with which a word from a respective generated vector appears in a first subset of other generated vectors that satisfies a threshold and (ii) identifying a second frequency with which the word appears in a second subset of the other generated vectors that does not satisfy the threshold, the first subset being different form the second subset; and
cause an output device to output the labeled operation logs to a display.

2. The classification device according to claim 1, wherein the processing circuitry is further configured to convert the operation content of the operation logs assigned a same label into a flowchart of items of the operation content arranged in a processing order, or convert items of the operation content described in the operation logs into a chart obtained by aggregating with respect to the label.

3. A classification method executed by a classification device, comprising:
obtaining operation logs describing operation content for a window on a terminal screen;
for each operation log of the obtained operation logs, generating a vector using words from the operation content for the operation log;
classifying, using a document classification method, a label to each group of a plurality of groups by (i) identifying a first frequency with which a word from a respective generated vector appears in a first subset of other generated vectors that satisfies a threshold and (ii) identifying a second frequency with which the word appears in a second subset of the other generated vectors that does not satisfy the threshold, the first subset being different form the second subset; and
causing an output device to output the labeled operation logs to a display.

4. A non-transitory computer-readable recording medium storing therein a classification program that causes a computer to execute a process comprising:
obtaining operation logs describing operation content for a window on a terminal screen;
for each operation log of the obtained operation logs, generating a vector using words from the operation content for the operation log;
classifying, using a document classification method, a label to each group of a plurality of groups by (i) identifying a first frequency with which a word from a respective generated vector appears in a first subset of other generated vectors that satisfies a threshold and (ii) identifying a second frequency with which the word appears in a second subset of the other generated vectors that does not satisfy the threshold, the first subset being different form the second subset; and
causing an output device to output the labeled operation logs to a display.

* * * * *